United States Patent [19]

Eisenhauer

[11] 4,083,121

[45] Apr. 11, 1978

[54] UNIVERSAL PLANISPHERE, SIGHT REDUCTION FINDER AND IDENTIFIER, GUIDANCE AND COMPUTER SYSTEM

[75] Inventor: William A. Eisenhauer, Van Wert, Ohio

[73] Assignee: The Eisenhauer Manufacturing Company, Van Wert, Ohio

[21] Appl. No.: 779,505

[22] Filed: Mar. 21, 1977

Related U.S. Application Data

[60] Continuation-in-part of Ser. No. 538,579, Jan. 6, 1975, Pat. No. 4,012,851, which is a division of Ser. No. 268,646, Jul. 3, 1972, Pat. No. 3,858,334, which is a continuation-in-part of Ser. No. 500, Jan. 5, 1970, Pat. No. 3,673,710, which is continuation of Ser. No. 600,920, Dec. 12, 1966, abandoned, which is a continuation-in-part of Ser. No. 369,598, May 25, 1964, Pat. No. 3,290,799, which is a continuation-in-part of Ser. No. 271,658, Apr. 9, 1963, Pat. No. 3,251,143, which is a continuation-in-part of Ser. No. 851,648, Nov. 9, 1959, Pat. No. 3,088,228.

[51] Int. Cl.² ............................................. G09B 29/00
[52] U.S. Cl. ....................................................... 35/44
[58] Field of Search .................. 35/44, 43; 58/3, 42.5, 58/43

[56] References Cited

U.S. PATENT DOCUMENTS

| 497,917 | 5/1893 | Gleason | 35/44 |
|---|---|---|---|
| 531,060 | 12/1894 | Ormsby | 35/44 |
| 1,873,595 | 8/1932 | Johnson | 35/44 |
| 2,921,386 | 1/1960 | Stefano | 35/44 |
| 3,290,799 | 12/1966 | Eisenhauer | 35/44 |
| 3,673,710 | 7/1972 | Eisenhauer | 35/44 |
| 3,858,334 | 1/1975 | Eisenhauer | 35/44 |
| 4,012,851 | 3/1977 | Eisenhauer | 35/44 |

FOREIGN PATENT DOCUMENTS

| 822,910 | 11/1951 | Germany | 35/44 |
|---|---|---|---|
| 882,320 | 7/1953 | Germany | 35/44 |
| 595,089 | 11/1947 | United Kingdom | 35/44 |

*Primary Examiner*—William H. Grieb
*Attorney, Agent, or Firm*—Whittemore, Hulbert & Belknap

[57] ABSTRACT

A planisphere including a navigation west and east dial and scales, sky map, Greenwich and transit indicator dials having an Ariers indicator, a Greenwich indicator and a transit scale indicator respectively thereon, and a reference rule, constructed and arranged to facilitate programming of the elements thereof to provide an automatic computerized reading directly of local hour angle of stars from a local hour angle scale of the sky mask dial for entering sight reduction tables for navigation purposes. The planisphere also includes specific time zone indications to facilitate correct programming thereof and a declination scale on the reference indicator for determining declination of stars. The transit scale indicator includes opaque and transparent portions arranged so that scales of the planisphere are completely visible on one side or the other of the planisphere. The planisphere includes similar dials, scales and indicators on opposite sides thereof, with the dials and scales so related and the indicators connected together at the outer end thereof, whereby a double check of the programming of the planisphere is possible. The opposite sides of the planisphere are in ground position and overhead configuration, respectively.

10 Claims, 3 Drawing Figures

UNIVERSAL PLANISPHERE, SIGHT REDUCTION FINDER AND IDENTIFIER, GUIDANCE AND COMPUTER SYSTEM

CROSS REFERENCE TO RELATED APPLICATIONS

The present application is a continuation-in-part of patent application Ser. No. 538,579, filed Jan. 6, 1975, which is now U.S. Pat. No. 4,012,851, issued Mar. 22, 1977, which is a division of application Ser. No. 268,646, filed July 3, 1972, which is now U.S. Pat. No. 3,858,334, issued Jan. 7, 1975, which is a continuation-in-part of application Ser. No. 500, filed Jan. 5, 1970, which is now U.S. Pat. No. 3,673,710, issued July 4, 1972, which is a streamlined continuation application of application Ser. No. 600,920, filed Dec. 12, 1966, now abandoned, which is a continuation-in-part of application Ser. No. 369,598, filed May 25, 1964, which is now U.S. Pat. No. 3,290,799, issued Dec. 13, 1966, which is a continuation-in-part of application Ser. No. 271,658, filed Apr. 9, 1963, which is now U.S. Pat. No. 3,251,143, issued May 17, 1966, which is a continuation-in-part of application Ser. No. 851,648, filed Nov. 9, 1959, now U.S. Pat. No. 3,088,228, issued May 7, 1963.

BACKGROUND OF THE INVENTION

1. Field of the Invention

The invention relates to an improved planisphere of the type disclosed in U.S. Pat. No. 3,858,334, which planisphere is directly programmable to provide local hour angle for entry into published sight reduction tables for navigational purposes. Time zone indications to facilitate correct programming of the planisphere and means for directly obtaining declination information for stars are also provided by the improved planisphere. In addition, the improved planisphere includes unique transit scale indicator structure providing full visualization of the planisphere dial scales.

2. Description of the Prior Art

In the past, instruments such as H.O. 2102-D referred to in more detail in U.S. Pat. No. 3,858,334 have been utilized for navigational purposes and particularly to determine initial line of sight from an estimated position toward a heavenly body for navigational purposes. H.O. 2102-D is deficient, however, in that the steps required are not in accordance with the actual movement and placement of the various elements involved in determining an initial line of sight; that is, the heavenly bodies, the Earth, and an assumed navigator position.

Thus, in using H.O. 2102-D, star distances are initially measured in astronomical terms. While no apparent error of application is involved with positioning the stars according to easterly right ascension, such positioning of the stars is unfortunate since the whole procedural design of direction and all of the pertaining elements developed for celestial navigation are all otherwise on a westerly direction course.

Accordingly, H.O. 2102-D is not generally understood and is used less than a more nearly conceptually correct instrument would be.

A better approach is to consider the same distribution of star positions on a westerly basis in terms of sidereal hour angle as in the present invention. As an added benefit from this better approach to the star locations, it is possible to effect a combination that allows proper diagram type programming of the present invention. With the present invention, the required elements are exactly in strict conformance with the same elements employed in the universal application of navigation diagrams and are useful in providing computed answers for the navigator's work sheet in the determination of the Sumner Line of Position by the Marcq St. Hilare Method of celestial navigation. The 2102-D starfinder and identifier does not work in such a straightforward way.

The present invention also incorporates right ascension scales. However, their employment is only intended to be used as a basis of providing astronomical considerations to those who may wish to use them in connection with applications where astronomical telescopes are employed. Such uses of the invention are aside from the main purpose of the present invention which is to adhere primarily to basic celestial navigation requirement restricted to sidereal hour angle or westerly scales of measure.

While the structure disclosed in U.S. Pat. No. 3,858,334 presents the elements represented therein in their proper relation, in order to provide direct entry into the sight reduction tables H.O. Publication No. 229 of the United States Naval Oceanographic Office, for marine navigation, the local hour angle of a heavenly body is required.

Further, U.S. Pat. No. 3,858,334 does not have time zone indications thereon or means for determining the declination of heavenly bodies in conjunction with the reference indicator thereof.

Also, the transit scale indicator of the structure of U.S. Pat. No. 3,858,334 completely covers some small portion of the dial scales on both sides of the planisphere so that some information on the planisphere is obscured on both sides of the planisphere at all times.

SUMMARY OF THE INVENTION

It is the purpose of the present invention to provide a planisphere computer system which is programmable to automatically provide a direct reading of local hour angle of navigational stars for entry into sight reduction tables for navigational purposes as, for example, provided by the sight reduction tables in H.O. publication No. 229, which planisphere is programmable in accordance with the normal movement of the earth and stars and in accordance with the assumed position of a navigator.

Further, it is desirable to delete extraneous information from the planisphere of the invention and to provide time zone indications thereon to facilitate the correct programming of the planisphere and to provide a declination scale on the reference indicator whereby the declination of heavenly bodies may be readily ascertained.

In addition, it is desirable to construct the transit scale indicator of the planisphere of the present invention so that all portions of the scales of the planisphere are viewable on one side or the other of the planisphere.

Also, the configuration of the dials, scales and indicators of the planisphere computer system are in ground position and overhead configuration on opposite sides thereof, and the indicators are connected together radially outwardly of the dials and are of different lengths whereby simultaneous programming of both sides of the planisphere takes place to provide a double check on computed quantities. The double check accomplished by simultaneously programming both sides of the planisphere provides an additional means of finding and identifying an individual star. Thus, the star position in its home constellation is also identified for configuration sighting purposes and is automatically positioned in its constellation configuration by the reference indicator.

DESCRIPTION OF THE PREFERRED EMBODIMENT

Figure 1:
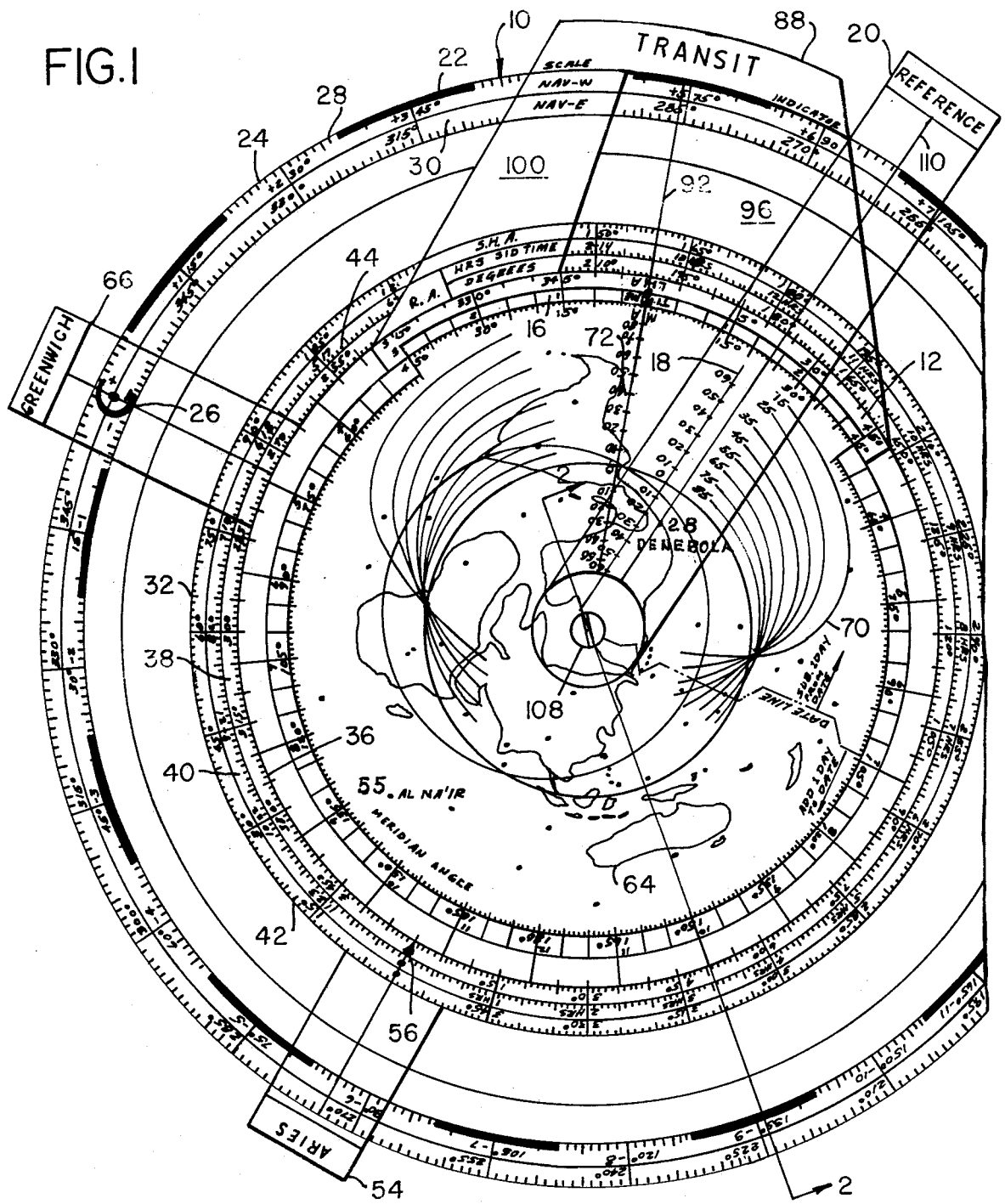
FIG. 1 is a plan view of one side of a planisphere connected in accordance with the invention, wherein the planisphere is in a northern hemisphere ground position configuration.

The planisphere 10 of the invention is similar to the planisphere disclosed in U.S. Pat. No. 3,858,334 referred to above. Reference is made to U.S. Pat. No. 3,858,334 for a more detailed description of the planisphere of the present invention, and in particular to the utilization thereof in both the northern and southern hemispheres in both a ground position and overhead configuration and the color coding thereof to facilitate the utilization of the present planisphere in both configurations and hemispheres.

In particular, the present planisphere 10 differs from the planisphere illustrated in U.S. Pat. No. 3,858,334 in that the Greenwich mean time, sun angle, standard time, local time, and the sun and moon phase position scales have been removed thereon. A local hour angle scale 12 has been added to the transit indicator dial 14 radially outwardly of the meridian angle scale 16 thereon. A declination scale 18 has been added to the reference indicator 20, and time zone indications 22 have been added to the navigation west and navigation east dial 24. Similar deletions and additions have been made on all planisphere configurations.

Figure 2:
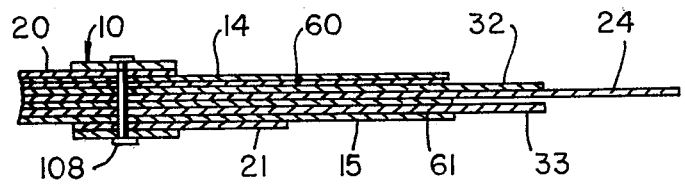
FIG. 2 is a partly broken away, enlarged section view of the planisphere illustrated in FIG. 1, taken substantially on the line 2—2 in FIG. 1.
Figure 3:
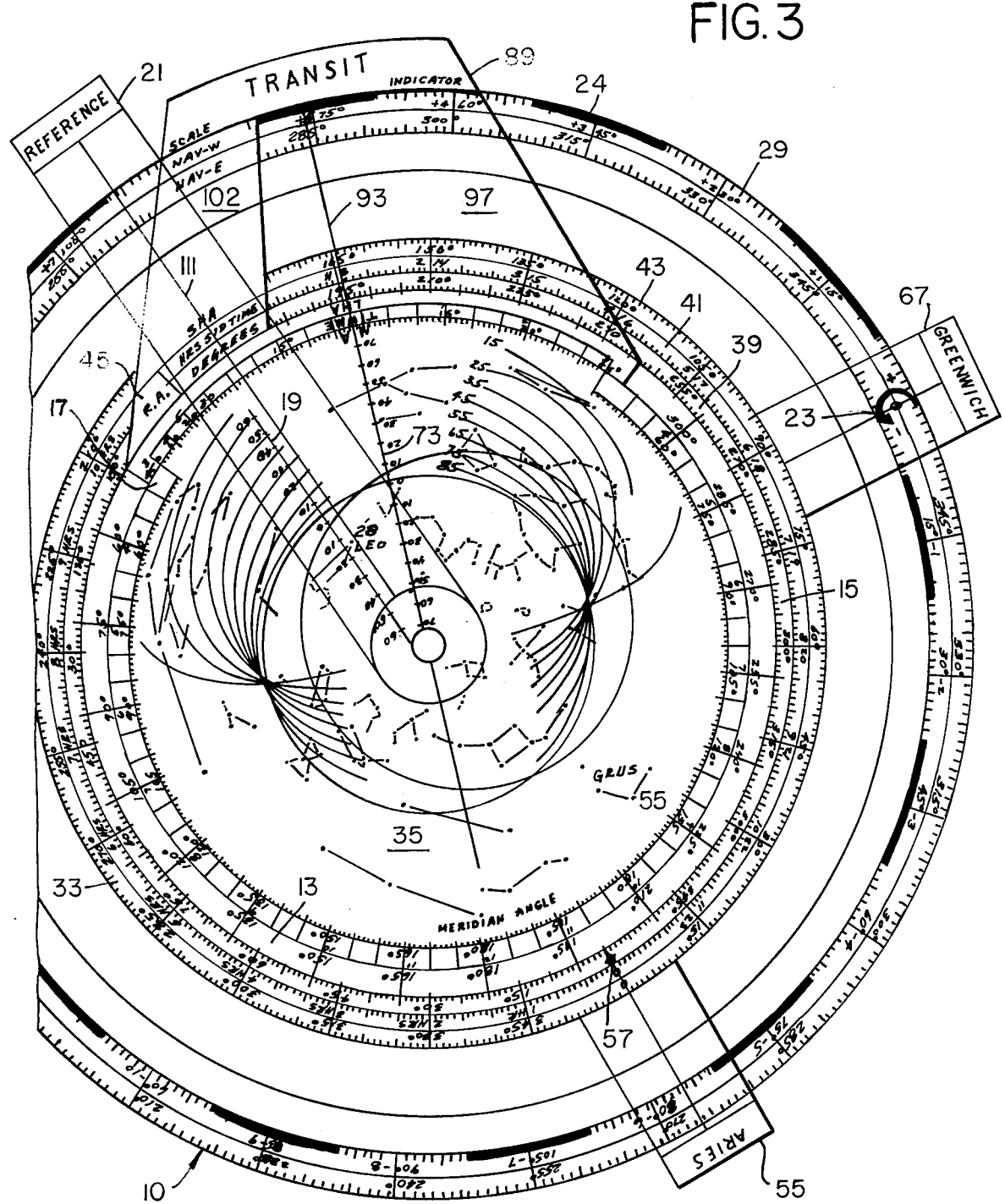
FIG. 3 is a plan view of the other side of the planisphere illustrated in FIG. 1, wherein the planisphere is in a northern hemisphere overhead configuration.

The planisphere structure as illustrated in FIGS. 1-3 permits direct reading of the local hour angle of heavenly bodies such as navigational stars for directly entering sight reduction tables for navigational purposes as published in H.O. Publication No. 229, U.S. Naval Oceanographic Office.

More specifically, the planisphere 10 includes the central navigation west and navigation east dial 24 having zero Greenwich indications 26 and 27 on opposite sides thereof. Navigation west dials 28 and 29 and navigation east dials 30 and 31, as shown best in FIGS. 1-3, are provided around the outer periphery of the navigation west and navigation east dial 24 on opposite sides thereof, as shown. The navigation west scale proceeds clockwise from zero to 360° and the navigation east dial proceeds from zero to 360° counterclockwise in the northern hemisphere ground position configuration as shown in FIG. 1. These scales are reversed on the overhead configuration of FIG. 3.

Time zone indicators 22 and 23 are provided on the navigation west and navigation east dial positioned as shown. The indicators 22 and 23 emphasize the necessity of providing time zone corrections for the navigator's position relative to Greenwich in the programming of the planisphere and thus facilitate the correct programming of the planisphere. As shown, the indicators 22 and 23 are provided for each hourly correction corresponding with the time zones on the Earth and thus each cover 15° on each side of zero, 15, 30, etc. degrees.

Sky map dials 32 and 33 which are smaller in diameter than the navigation west and navigation east dial 24 are positioned concentric with the navigation west and navigation east dial 24 on opposite sides thereof as shown best in FIG. 2. The sky map 34 as shown in FIG. 1 on sky map dial 32 is in a hemisphere ground position configuration showing the navigational stars in the hemisphere in proper relation to each other. Only Denebola 28 and A1 Na'ir 55 of the navigational stars are named and numbered in FIG. 1 due to drawing space limitations. In a complete planisphere 10 all fifty-seven navigational stars would be named and numbered. Radially outwardly of the sky map 34 at the outer periphery of the sky map dial 32, a right ascension scale 44 including both degrees and hours of sidereal time scales 38 and 40 and a sidereal hour angle scale 42 are provided, respectively. A similar sky map 35 and scales 45, 39, 41 and 43 for the overhead configuration of the stars in the northern hemisphere, and with the scales appropriately reversed, are provided on the sky map dial 33 illustrated in FIG. 3. Again, only two constellations, Leo and Grus, are named, and the number of the two navigational stars 28 and 55, respectively, in the constellations are provided in FIG. 3 due to drawing space limitations.

Aries indicators 54 and 55 extend radially outwardly of the sky map dials 32 and 33 beyong the outer periphery of the navigation west and navigation east dial 24 and are connected together at their outer periphery, whereby the sky map dials 32 and 33 are required to rotate together. The Aries indicators 54 and 55 are centered on the zero point of the scales on the sky map dials and indicate the first point of Aries. A first point of Aries indicator 56 is provided on the sky map dial 32. A similar first point of Aries indicator 57 is provided on the sky map 33.

Greenwich dials 60 and 61 are provided radially inwardly of the right ascension scales 44 and 45 on the sky map dials 32 and 33. The Greenwich dial 60 is provided with a polar projection of the northern hemisphere 64 thereon which is centered concentrically with the navigation west and navigation east dial 24 and the sky map dials 32 and 33. The Greenwich dial 60 is transparent except for the polar map thereon and is positioned over the sky map dial 32.

The Greenwich dial 61 is provided with a southern hemisphere polar projection map (not shown) thereon. Since FIG. 3 is in an overhead northern hemisphere configuration, the Greenwich dial is positioned under the sky map dial 33 so that the southern hemisphere map is not shown. The Greenwich dial 61 will only be visible on the planisphere being changed to a southern hemisphere configuration, in accordance with the disclosure in U.S. Pat. No. 3,858,334.

The Greenwich indicators 66 and 67 extend radially outwardly from the Greenwich dials 60 and 61 in alignment with the Greenwich meridian. The Greenwich indicators 66 and 67 again are connected together at the radially outer end thereof radially outward from the navigation west and navigation east dial 24.

The transit indicator dial 14 in FIG. 1 includes thereon a plurality of horizon lines 70 for the different latitudes indicated in 10° increments and is transparent over the sky map 34, whereby the horizon lines indicate the stars visible on the sky map at particular latitudes at a particular time in accordance with the relative position of the sky map dial 24 and the transit indicator dial 14.

A single degree scale of latitudes 72 is also provided on the transit indicator dial, which also serves to orient the Circle Scale of Azimuth. This scale must be centered specifically at the nearest degree of latitude of the navigator to correctly fulfill its primary purpose. As previously indicated, the meridian time and angle scale 16 and the local hour angle scale 12 are provided on the transit indicator dial 14 radially inwardly of the right ascension scale 44 of the sky map.

Similar horizon lines 71, degree of latitude scale 73, and meridian time and angle, and local hour angle scales 17 and 13, respectively, are provided on the transit indicator dial 15 in FIG. 3, again with scales appropriately reversed.

A transit scale indicator 88 and a transit scale indicator 89 are provided on the transit indicator dials 14 and 15, respectively, and also extend radially beyond the navigation west and navigation east dial 24 and are connected together at their outer periphery. In particular, it will be noted that meridian lines 92 and 93 are provided on the transit scale indicators 88 and 89 and that each of the transit scale indicators 88 and 89 have transparent portions 96 and 97, respectively, which permit viewing of all portions of the planisphere scale on one side or the other side of the planisphere. Both of the transit scale indicators 88 and 89 are further provided with opaque portions 100 and 102 on which the scale indications are provided.

The planisphere 10 is completed by the reference indicators 20 and 21 extending radially outwardly therefrom. The reference indicators 20 and 21 are again connected together at their radially outer ends and are pivotally mounted centrally of the navigation west and navigation east 24, sky map 32 and 33, Greenwich 60 and 61, and transit indicator 14 and 15 dials, all of which are concentric, by means of the pivot pin 108 which releasably holds the planisphere 10 in assembly. Indicator lines 110 and 111 are provided on the reference indicators. Parallel to but spaced from the indicator lines 110 and 111, declination scales 18 and 19 are provided on the reference indicators, as shown best in FIGS. 1 and 3. It will, of course, be understood that indicator lines 110 and 111 serve to correctly position the reference indicators 20 and 21 instead of the parallel scales 18 and 19.

The declination scales 18 and 19 require the 0° reference at the equatorial position. The declination scales properly measure the distance of the star leg of the navigational triangle.

As indicated above, the planisphere 10 is particularly useful in providing a line of sight in terms of local hour angle for entry into sight reduction tables for navigation purposes as published by the U.S. Naval Oceanographic Office in H.O. Publication No. 229.

Thus, in providing a particular line of sight for a particular navigational star through the use of the planisphere 10 constructed as above indicated, it will be assumed that the navigator is off the coast of Florida at 74° longitude and that he desires to get into the Sight Reduction Tables for Navigation as published by the U.S. Naval Oceanographic Office, H.O. Publication No. 229. Further, it will be assumed that the date is May 25, 1976, and that the zone time of the navigator is 9 o'clock in the evening.

With such assumptions, the Greenwich dial 60 is rotated until the Greenwich indicator 66 is directly on the zero mark at the Greenwich indication 26 on the navigation west and navigation east dial 24 on the northern hemisphere ground position side of the planisphere 10. Next, the transit indicator dial 14 is rotated to place the indicator line 92 on the transit scale indicator 88 on the navigator's assumed longitude of 74° on the navigation west scale 28 of the navigation west and navigation east dial 24.

Using the Nautical Almanac for the year 1976, as published by the U.S. Government Printing Office, Washington, D.D., for the date of May 25, 1976, at 9 o'clock in the evening, or 2100 hours, the first point of Aries has a discrete Greenwich hour angle in the Greenwich time zone itself. However, since the navigator's assumed position of 74° longitude on the navigation west scale 28 of dial 24 is in the fifth time zone clockwise from the zero Greenwich indication 26 as shown by the time zone indicator 22, 5 hours must be added to the Greenwich time for entry into the Nautical Almanac. Entry into the Nautical Almanac is therefore made for 2 o'clock on the morning of May 26th. The first point of Aries is thus 174°. The sky map dial 32 is then rotated to place the Aries indicator 54 at 174° on the navigation west scale 28.

The planisphere is thus completely programmed to place all of the heavenly bodies and the Earth as shown on the dials 32 and 60 in their proper relation for the assumed position of the navigator on the assumed date at the assumed time.

The reference indicator is then moved to pass through a navigational star, Denebola, shown on the sky map 34. It is found that the local hour angle of the star Denebola on the west coast of Central America, which is within the horizon of the assumed latitude, is 23° as read directly from the local hour angle scale 12 on the sky mask dial 14 under the indicator line 110 of reference indicator 20.

Since the reference indicator, as well as the Greenwich, Transit Scale and Aries indicators on the ground position side of the planisphere are secured to the same elements on the overhead side of the planisphere, a check may be made by viewing the overhead side of the planisphere to find that the reference indicator with the planisphere so programmed will pass through Denebola in the constellation Leo.

The local hour angle of the star Denebola may then be used in further computations in accordance with H.O. Publication No. 229, as desired.

Thus, a desired Hc, d and z may be read from H.O. Publication No. 229, using the reference "Index to Selected Stars 1976" which gives the declination of Denebola as N.15°. In such reading, care must be taken to read the correct latitude column, since latitude is the second entering argument for the sight reduction tables. The sextant may then be set for a sight in the proper direction at a selected second of time and work sheets for the determination of the Summer Line of Position by the Marcq St. Hilaire Method may be expected and a position plotted.

In the above approach, it should be borne in mind that the establishment of fairly accurate measurements per hour selected to insure the pointing of the sextant with the element of certainty that should accompany the instrumentation procedure so involved are more specifically dealt with. Preparing the groundwork in a workmanlike and comprehensive manner will provide the navigator with a more professional sense of accomplishment than can be obtained when limited to the seemingly careless results by comparison that H.O. 2102-D can provide.

In general, when the basic importance of having available a yearly corrected Nautical Almanac in terms of Greenwich mean time is understood, the value of electronically computed readings that can be adjusted down to tenths of minutes of arc per second of time and the fact they can be employed and adjusted universally through the (12+) westerly and (12−) easterly zone areas of the world through the use of zone designations places the Nautical Almanac in an incalculable position of highest value in the field of sight reduction navigation. Zone number adjustment value scales are equally important as a consequence. The time zone indicators 22 and 23 guard against oversight and guarantees the correctness of the adjustment factor so applied and so vital to the integrity of the sight reduction expertise worthy of a justly qualified navigator who consequently then deserves trust.

Further, it will be noted that the meridian angle scales 16 on the transit indicator dial 14 will provide the complement of the local hour angle to permit direct entry into the Sight Reduction Tables of H.O. Publication No. 229 without any computation with local hour angles over 180°. The local hour angle readings beyond 180° are exactly equivalent to meridian angle readings.

Also, the declination of the star Denebola can be read from the scale 18 on the reference indicator and it can be used in conjunction with either the right ascension or the sidereal hour angle from scales 38, 40 and 42, to locate the stars, if required. Thus, any heavenly body, the coordinates of which are known, with either navigational or astronomical reference, may be found by use of the planisphere 10.

In addition, it will be noted that if the heavenly bodies which it is desired to locate or determine the position of for bubble transit sighting are placed so that the transit scale indicator 88 obscures the scales so that the exact reading of the scale is obscured on one side of the planisphere 10, it will be readily viewable on the other side of the planisphere due to the arrangement of the transparent and opaque portions of the transit indicators 88 and 89, in accordance with the invention.

Thus, beyond the use of the basic hourly readings for finding and identification purposes adjusted to time zones as covered above, the invention includes other features. It should provide a more comprehensive frame of reference that should accompany assertions of the complete aptitude of the invention as a worthy factor contributing toward a totally satisfying process now available and open to the navigator using the full sight reduction systems of celestial navigation as so provided.

Once the complete orientation of the universal planisphere has been established with reference to the hourly tables, the readings are also provided for recording the positions of the four planets, Venus, Mars, Jupiter and Saturn, as well as sidereal hour angle readings of the 57 star listings so arranged on the sky and ground maps of the planisphere. The Greenwich hour angle readings for the Sun and Moon as well are recorded, and all of course are readily recorded, too, on the universal planisphere in conformance with the sight reduction practices employing the H.O. 229 Sight Reduction Tables.

The full threshold of instrumentation has thus been obtained via this supportive approach ready for the actual introduction of the sextant and what it then contributes at this stage of the sight reduction process. The actual sightings of the sextant per second of time then introduces the readings of the elevations of the sky objects to tenths of minutes on the scales of the sextant. And now this information can be utilized for the navigator's worksheet values of $H_o$ so determined.

The part-time elements of the more exacting readings of altitude according to the exact application of minutes and seconds of time beyond the hour readings can then be employed to utilize the adjustment tables for so correcting the so computed $H_o$ book tables that then serve the interests of the "intercept method" which then serves to tie the two approaches properly together, using the greater or less angular differences to correctly determine the Sumner Line of Position thereby. The coverage above is primarily limited to the hourly altitude problem. However, the azimuth problem is within the skill of the navigator which will become more apparent once the navigator adapts the altitude phase of application per H.O. 229 and the circle scale of azimuth. Of course, the circle scale of azimuth also involves the employment of the same scale for establishing a basis for triangulation purposes as well. This added feature first applied to H.O. 214 Sight Reduction Tables carries over to similar procedural implications and use as it pertains to H.O. 229 Sight Reduction Tables as well.

It can justly be stated that the universal planisphere of the invention contributes more particularly to the Sight Reduction Tables H.O. 229 solutions more so than the oriented finder, identifier and computer designed for H.O. 214 use.

In considering what pertains to the basic difference between the two sets of the tables involved, it will be remembered that when the development of the values of local hour angle for H.O. 229 use are primarily required, the structure of the invention adds the specific local hour angle scale in addition to the meridian angle scale without disturbing the meridian angle computation connected with the H.O. 214 use.

Actually, of course, the same effect of measuring the altitudes involved does not change the mathematics in either case. However, by employing both type scales on the invention, the double benefit of making the computed values apply to not only H.O. 229 use, but to H.O. 214 use as well is accomplished. H.O. 214 will control most navigators for a long time to come. H.O. 229 on the other hand will control the procedures of only the converted H.O. 214 people, whereas newly trained navigators will be mainly controlled by the Sight Reduction Tables H.O. 229. The real reason for changing over to H.O. 229 in 1975 was to finally adapt and adopt a system thereby to introduce more precision into the process of determining the courses and positions connected with the advent of introducing space vehicles to the scene of navigation and its specific areas of concerns.

By using local hour angle values instead of meridian angles, it is possible as a consequence to change the format of the table presentations involved even though the basis for solving the navigational triangle does not change at all. The difference of precision between H.O. 229 and H.O. 214 is of no concern here. The main concern here is to understand that the structure of the invention is exactly specific within the requirements of the H.O. 229 sight reduction system and obviates the necessity of providing opening arguments through a supplemental reliance upon an independent diagram instead. The invention is superior to H.O. 2102-D, which provides no way of substituting for the diagrams in question that must be devised as such to avoid the complications brought about by the inadequacy of H.O. 2102-D to operate in that capacity.

It is also appropriate to recognize that resorting to local hour angle readings instead of meridian angle readings does not introduce anything mathematically different, although one might be inclined to think so from the working in the text of Duttons Twelfth Edition. Although the change indicates easterly versus westerly direction of positions in a more definite way, the invention demonstrates educationally at least that local hour angle and meridian angle measurements are exactly equivalent otherwise in any event.

As an additional note with respect to further precision beyond the hourly but exacting time so provided, it is believed the best interest of serving sight reduction is to avoid the tendency to involve the inclusion of minutes of time in the finding and identification process. It is recommended that the navigator rely on his ability to extrapolate the positions as they change ever so slightly from the hour positions just prior to their observation and instrumentation by the sextant itself. This suggestion is a very practical one when it is remembered the time span involved is inconsequential and that the sextant must point to a so known but slow moving star. Also, anything that requires the simplest use of paper and pencil tends to defeat the basic tenet of the principal of sight reduction as such.

Once a star is so identified and the official sextant instrumentation sighting time becomes an established fact based on a second of actual time, then the so adjusted and corrected figures become the controlling factor in the work sheet process that then ensues. The final use of the Intercept Method to plot the Sumner Line of Position depends upon the precision of the sectant reading itself to finish out the processes so involved on the basis of the second phase of employing the Sight Reduction Table, H.O. 229 in work sheet form. In such other cases, simply repeat the process of again employing the finder to furnish other Local Hour Angle readings to solve other intercept plot values.

Once the work sheets have been processed to the exhaustive requirements of the development toward the determination of the Sumner Line of Position by the Marc St. Hilaire Method, the finder and identifier have again been utilized for entering the H.O. 229 Sight Reduction Tables. As a computer it will definitely serve the same function as it did for finding and identification to establish the L.H.A. required. The elements pertaining to the diagram development are all present as before for again entering Sight Reduction Tables H.O. 229 and stand ready to serve the requirements of instrumentation precision as it applies to this segment of interest and as subsequently employed.

However, the procedure prior to the work sheet segment of endeavor that follows the previous use of the sight reduction readings of altitude and azimuth for pointing the sextant also involves the application of the Circle of Azimuth. This additional device centers on the local latitude of the navigator. It is quite important to recognize the true value that this see-through type scale contributes toward understanding the straight line over any great circle application so imparted and so radiated for solving distances and directions. By so doing, any and all great circles emanating from the single degrees of coordinated position of the navigator supplies the ultimate answer of orientation to the navigator. Therefore, this so finalized beginning actually places and centers the basic position emphasis exactly where it should be. In other words, the spherical world of celestial navigation with the utmost but due regard for the safety of those depending upon that procedure is so placed on the flat world map concept it turns out to be. In turn, of course, by so treating all other centers of concern in the rest of the world on the same basis supplies the navigator with like maps of flat application to allow him to plot his courses of travel from where he is to where he wants to go. This demonstrates the importance and use of the latitude scale on the Transit Indicator as the center of orientation for the navigator in terms of azimuthal equidistance.

While one embodiment of the invention has been disclosed in detail, other embodiments and modifications thereof are contemplated. It is the intention to include all embodiments and modifications as are defined by the appended claims within the scope of the invention.

What I claim as my invention is:

1. Planisphere computer structure comprising a central navigation west and navigation east dial having a zero Greenwich indication thereon and navigation west and navigation east scales about the outer periphery thereof proceeding 360° clockwise and counterclockwise from the zero Greenwich indication, a sky map dial on at least one side of the navigation west and navigation east dial and concentric therewith having a ground position sky map thereon and a first point of Aries zero indication thereon and circumferential sidereal hour angle and right ascension sidereal time and degree scales thereon proceeding respectively in a clockwise direction from zero to 360°, in a counterclockwise direction from zero to 24 hours, and from zero to 360°, which scales are radially inwardly of the navigation west and navigation east scales of the navigation west and navigation east dial, a Greenwich dial concentric with the navigation west and east dial and sky map dial and positioned over the sky map dial on the other side thereof from the navigation west and east dial radially within the sidereal hour angle and right ascension scales on the sky map dial, which Greenwich dial is transparent and has thereon a ground position azimuthal equidistant polar map, a concentric transit indicator dial positioned over the Greenwich dial which is transparent and includes horizon lines for different latitudes thereon and which has peripheral, circumferentially extending meridian angle and meridian time scales thereon reading both clockwise and counterclockwise from one to 180° and from 0 to 12 hours in each direction over 180° respectively, an Aries indicator extending radially outwardly from the sky map dial at the first point of Aries, a Greenwich indicator extending radially outwardly from the Greenwich meridian on the Greenwich dial, a transit scale indicator extending radially outwardly from the sky mask dial including transparent and translucent portions with the transparent portions extending over more than one-half of the circumferential extent of the transit scale indicator, a reference indicator extending radially outwardly from the center of the concentric dials having a reference line thereon, and pivot means extending through each of the dials centrally thereof and through the inner end of the reference indicator for permitting relative rotation of each of the dials about the pivot means and permitting rotation of the reference rule about the inner end thereof.

2. Structure as set forth in claim 1, and further including separate time zone indications on the navigation west and navigation east dial proceeding from 0 to 180° in 15° increments each way from the zero Greenwich indication to aid in establishing the time correction from Greenwich time for local position.

3. Structure as set forth in claim 1, and further including a local hour angle scale radially outwardly of the meridian angle and time scales on the transit indicator dial proceeding from zero to 360° in a clockwise direction.

4. Structure as set forth in claim 1, and further including a declination angle scale on the reference indicator offset from the reference line thereon for determining declination of individual heavenly bodies.

5. Structure as set forth in claim 1, and further including separate time zone indications on the navigation west and navigation east dial proceeding from zero to 180° in 15° increments each way from the zero Greenwich indication to aid in establishing the time correction from Greenwich time for local position, and a local hour angle dial radially outwardly of the meridian angle and time scales on the transit indicator dial proceeding from zero to 360° in a clockwise direction.

6. Structure as set forth in claim 1, and further including separate time zone indications on the navigation west and navigation east dial proceeding from zero to 180° in 15° increments each way from the zero Greenwich indication to aid in establishing the time correction from Greenwich time for local position, and a declination angle scale on the reference indicator offset from the reference line thereon for determining declination of individual heavenly bodies.

7. Structure as set forth in claim 1, and further including a local hour angle scale radially outwardly of the meridian angle and time scales on the transit indicator dial proceeding from zero to 360° in a clockwise direction, and a declination angle scale on the reference indicator offset from the reference line thereon for determining declination of individual heavenly bodies.

8. Structure as set forth in claim 1, and further including separate time zone indications on the navigation west and navigation east dial proceeding from zero to 180° in 15° increments each way from the zero Greenwich indication to aid in establishing the time correction from Greenwich time for local position, a local hour angle scale radially outwardly of the meridian angle and time scales on the transit indicator dial proceeding from zero to 360° in a clockwise direction, and a declination angle scale on the reference indicator offset from the reference line thereon for determining declination of individual heavenly bodies.

9. The method of use of planisphere computer structure as set forth in claim 8, wherein the computer structure is programmed by first placing the Greenwich indicator over the zero Greenwich indication on the navigator west and navigator east dial, placing the transit scale indicator on the transit indicator dial over an assumed observer longitude and placing the Aries indicator on the sky map dial at the corrected Greenwich hour angle corrected for zone time of the observer to orient the planisphere computer structure whereby the local hour angle of any navigational star may be immediately determined on placing the reference indicator over the navigational star in question and reading the local hour angle directly on the local hour angle scale on the transit indicator dial under the reference indicator, and placing the reference indicator on a desired navigational star and reading the local hour angle of the desired star on the reference indicator dial.

10. The method as set forth in claim 9, and further including the step of reading the declination of the desired star from the declination angle scale on the reference indicator positioned on the desired star.

* * * * *